United States Patent
Blue et al.

(10) Patent No.: US 11,472,996 B2
(45) Date of Patent: Oct. 18, 2022

(54) METHODS FOR WELLBORE STRENGTHENING

(71) Applicant: M-I L.L.C., Houston, TX (US)

(72) Inventors: Aaron Blue, Richmond, TX (US); Josh Sheldon, Richmond, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 16/652,060

(22) PCT Filed: Oct. 1, 2018

(86) PCT No.: PCT/US2018/053679
§ 371 (c)(1),
(2) Date: Mar. 29, 2020

(87) PCT Pub. No.: WO2019/068064
PCT Pub. Date: Apr. 4, 2019

(65) Prior Publication Data
US 2020/0248062 A1 Aug. 6, 2020

Related U.S. Application Data

(60) Provisional application No. 62/565,285, filed on Sep. 29, 2017.

(51) Int. Cl.
| | | |
|---|---|---|
| *C09K 8/42* | (2006.01) | |
| *E21B 21/00* | (2006.01) | |
| *E21B 43/22* | (2006.01) | |
| *E21B 33/13* | (2006.01) | |

(52) U.S. Cl.
CPC ........... *C09K 8/426* (2013.01); *E21B 21/003* (2013.01); *C09K 2208/08* (2013.01)

(58) Field of Classification Search
CPC .......... C09K 8/36; C09K 8/502; C09K 8/035; C09K 8/32; C09K 8/032; C09K 8/516; C09K 8/34; E21B 33/138; E21B 21/003; E21B 7/00; E21B 43/16; E21B 21/00; E21B 47/12
See application file for complete search history.

(56) References Cited

U.S. PATENT DOCUMENTS

| | | |
|---|---|---|
| 5,942,468 A | 8/1999 | Dobson, Jr. et al. |
| 6,364,020 B1 | 4/2002 | Crawshaw et al. |
| 2008/0171670 A1 | 7/2008 | Cowan et al. |
| 2010/0210480 A1* | 8/2010 | Ballard ................ C09K 8/502 507/117 |
| 2010/0258313 A1 | 10/2010 | Ballard |
| 2015/0197998 A1* | 7/2015 | Kapila .................. B01D 21/01 166/244.1 |
| 2017/0174975 A1 | 6/2017 | De Stefano et al. |
| 2022/0033702 A1 | 2/2022 | Young et al. |

FOREIGN PATENT DOCUMENTS

| | | |
|---|---|---|
| WO | 2014/120032 A1 | 8/2014 |
| WO | 2017/112849 A1 | 6/2017 |

OTHER PUBLICATIONS

International Preliminary Report on Patentability for the counterpart International patent application PCT/UJS2018/053679 dated Apr. 9, 2020.
International Search Report and Written Opinion for the counterpart International patent application PCT/US2018/053679 dated Jan. 17, 2019.
Extended Search Report R. 62 EPC issued in European Patent Application No. 18860185.0 dated May 21, 2021, 5 pages.
International Search Report and Written Opinion issued in International Patent application PCT/US2019/060851 dated Apr. 9, 2020, 10 pages.
International Preliminary Report on Patentability issued in International Patent application PCT/US2019/060851 dated May 27, 2021, 7 pages.

* cited by examiner

*Primary Examiner* — Zakiya W Bates
(74) *Attorney, Agent, or Firm* — Garry Brown, Jr.

(57) ABSTRACT

A wellbore fluid may include an oleaginous fluid forming a continuous phase; a non-oleaginous fluid forming a discontinuous phase; at least one emulsifier stabilizing an emulsion of the non-oleaginous continuous phase within the oleaginous continuous phase; and at least one viscosifier dispersed into the oleaginous continuous phase in a concentration of at least 4 ppb; wherein upon subjecting the wellbore fluid to shear rate of at least 10,000 s-1, the emulsion is disrupted and the non-oleaginous fluid contacts the at least one viscosifier, thereby solidifying the wellbore fluid.

18 Claims, No Drawings

METHODS FOR WELLBORE STRENGTHENING

CROSS-REFERENCE TO RELATED APPLICATIONS

This application is the United States national phase of International Patent Application No. PCT/US2018/053679, filed Oct. 1, 2018, and entitled, "Methods for Wellbore Strengthening," which claims the benefit of, and claims priority to U.S. Provisional Application No. 62/565,285, entitled "METHODS FOR WELLBORE STRENGTHENING," filed Sep. 29, 2017, the disclosure of which is hereby incorporated herein by reference.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

As stated above, wellbore fluids are circulated downhole to remove rock, as well as deliver agents to combat the variety of issues described above. Fluid compositions may be water- or oil-based and may contain weighting agents, surfactants, proppants, viscosifiers, and fluid loss additives. However, for a wellbore fluid to be effective during wellbore operations, the fluid has to stay in the borehole. During drilling operations, variations in formation composition may lead to undesirable fluid loss events in which substantial amounts of wellbore fluid are lost to the formation through large or small fissures or fractures in the formation or through a highly porous rock matrix surrounding the borehole. While fluid loss is often associated with drilling applications, other fluids may experience fluid loss into the formation including wellbore fluids used in completions, drill-in operations, productions, etc. Lost circulation may occur naturally in formations that are fractured, highly permeable, porous, cavernous, or vugular. Furthermore, in vugular formations, conventional LCMs are not effective due to the size of the caverns. Thus, understanding the extent of the vugs and fractures and the mechanism of losses can help to combat these losses with efficient solutions and may allow the continuation of the drilling operation.

During cement operations, in low-pressure reservoirs, the challenge is always to find an acceptable balance between the liquid cement slurry properties necessary to place the slurry successfully and the set cement properties once the slurry is in place. Often in low-pressure reservoir cementing, it is difficult to achieve well balance between pore and fracture pressures even before the cementing operations begin. Current technologies cannot predict and manage wellbore fluid losses to the formation during drilling. Wellbore fluid losses may cause operational delays as the drill pipe is removed to allow changes to pipe geometry for expensive and time consuming circulation loss treatments.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to a wellbore fluid that includes an oleaginous fluid forming a continuous phase; a non-oleaginous fluid forming a discontinuous phase; at least one emulsifier stabilizing an emulsion of the non-oleaginous continuous phase within the oleaginous continuous phase; and at least one viscosifier dispersed into the oleaginous continuous phase in a concentration of at least 4 ppb; wherein upon subjecting the wellbore fluid to shear rate of at least 10,000 $s^{-1}$, the emulsion is disrupted and the non-oleaginous fluid contacts the at least one viscosifier, thereby solidifying the wellbore fluid.

In another aspect, embodiments in accordance with the present disclosure may include a method of reducing loss of a wellbore fluid in a wellbore to a formation, where the method includes pumping a wellbore fluid into the wellbore, the wellbore fluid having an oleaginous fluid forming a continuous phase; a non-oleaginous fluid forming a discontinuous phase; at least one emulsifier stabilizing an emulsion of the non-oleaginous continuous phase within the oleaginous continuous phase; and at least one viscosifier dispersed into the oleaginous continuous phase in a concentration of at least 4 ppb; subjecting the wellbore fluid to shear forces generated by pumping the wellbore fluid into the formation through a nozzle in a drill bit, thereby exposing the viscosifier to the non-oleaginous fluid; and allowing the wellbore fluid to solidify.

Other aspects and advantages of the invention will be apparent from the following description and the appended claims.

DETAILED DESCRIPTION

Generally, embodiments disclosed herein relate to methods of treating fluid loss in downhole formations. More specifically, embodiments disclosed herein relate to wellbore fluids formed of an oleaginous fluid forming a continuous phase, a non-oleaginous fluid forming a discontinuous phase, at least one emulsifier that stabilizes an emulsion of the non-oleaginous continuous phase within the oleaginous continuous phase and at least one viscosifier dispersed into the oleaginous continuous phase. The inventor of the present disclosure has found that upon subjecting the wellbore fluid to specific shear forces, the emulsion is disrupted and the non-oleaginous fluid may contact the at least one viscosifier, thereby solidifying the wellbore fluid.

In one aspect, embodiments disclosed herein relate to wellbore fluids such as invert emulsions for downhole applications and methods of selectively triggering such wellbore fluids to set up as a gel or substantially solid material upon disruption of the emulsion due to shear forces. As described later in greater detail, the solid components of the wellbore fluid are originally oil-wet, being dispersed into the oleaginous continuous phase. Upon subjecting the wellbore fluid to specific shear forces, the emulsion may be disrupted, allowing the components to interact and set up as a gel or substantially solid material. Specifically, hydration of components and/or chemical reactions may occur when the non-oleaginous fluid contacts the species dispersed into the oleaginous continuous phase. Consequently, the wellbore fluid may solidify, forming a gel or a substantially solid material, and allowing therefore a lost circulation zone to be closed off quickly.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

As noted above, the wellbore fluids of the present disclosure may be oil-based wellbore fluids, such as emulsions of oleaginous and non-oleaginous fluids. In particular, various embodiments of the present disclosure may provide for an invert emulsion wellbore fluid. Invert emulsion, as used herein, is an emulsion in which a non-oleaginous fluid is the discontinuous phase and an oleaginous fluid is the continuous phase. The non-oleaginous fluid (such as water) is dispersed in spherical form by agitation of a mixture of a non-oleaginous and an oleaginous fluid (such as an oil and water mixture) in the presence of an emulsifier.

Oleaginous liquid, as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

Non-oleaginous liquid as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these.

The wellbore fluid of the present disclosure may include emulsifiers or emulsifier systems for stabilizing the system as a whole. As defined herein, an emulsifier is a type of surfactant that aids in forming of an emulsion (i.e., a mixture of two or more liquids that are normally immiscible). Surfactants are surface active compounds, that is, they show higher activity (i.e., concentration) at the surface or interface than the bulk solution phase. Specifically, surfactants are organic compounds that are amphiphilic, meaning they contain both hydrophobic groups ("tails") and hydrophilic groups ("heads"). Therefore, a surfactant contains both an oil soluble component and a water soluble component. Due to this property, they lower the surface tension of a liquid, the interfacial tension between two liquids, or that between a liquid and a solid. Surfactants may act as detergents, wetting agents, emulsifiers, foaming agents, and dispersants.

Emulsifiers that may be suitable for use in wellbore fluids may include, for example, fatty acids, soaps of fatty acids, amidoamines, polyamides, polyamines, fatty acid ester derivatives, ethoxylated fatty acids, ethoxylated alcohol, oleate esters, such as sorbitan monoleate, sorbitan dioleate, imidazoline derivatives or alcohol derivatives and combinations of thereof. in particular embodiments, the emulsifier may be an amidoamine. For example, one or more embodiments, a fatty acid (one or more of a C10-C24 fatty acid, for example, which may include linear and/or branched, and saturated and/or unsaturated fatty acids) may be reacted with one or more ethyleneamines (e.g., ethylenediamine, diethylenetriamine, triethylenetetraamine, tetraethylenepentaamine) to produce one or more of amides, polyamides, and/or amidoamines, depending, for example, on the mole ratio of the polyamine to the fatty acid. In one or more embodiments, the emulsifier may be a dimer poly-carboxylic C12 to C22 fatty acid, trimer poly-carboxylic C12 to C22 fatty acid, tetramer poly-carboxylic C12 to C22 fatty acid, mixtures of these acids, or a polyamide wherein the polyamide is the condensation reaction product of a C12-C22 fatty acid and a polyamine selected from the group consisting of diethylenetriamine, tri ethylenetetramine; and tetraethylenepentamine.

In some embodiments, the emulsifier may be an alkoxylated ether acids. In one or more embodiments, an alkoxylated ether acid is an alkoxylated fatty alcohol terminated with an carboxylic acid, represented by the following formula:

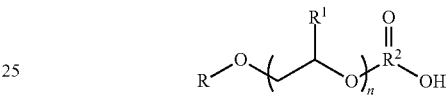

where R is $C_6$-$C_{24}$ or —C(O)$R^3$ (where $R^3$ is $C_{10}$-$C_{22}$), $R^1$ is H or $C_1$-$C_4$, $R^2$ is $C_1$-$C_5$ and n may range from 1 to 20. Such compounds may be formed by the reaction of an alcohol with a polyether (such as poly(ethylene oxide), poly(propylene oxide), poly(butylene oxide), or copolymers of ethylene oxide, propylene oxide, and/or butylene oxide) to form an alkoxylated alcohol. The alkoxylated alcohol may then be reacted with an α-halocarboxylic acid (such as chloroacetic acid, chloropropionic acid, etc.) to form the alkoxylated ether acid. In a particular embodiment, the selection of n may be based on the lipophilicity of the compound and the type of polyether used in the alkoxylation. In some particular embodiments, where $R^1$ is H (formed from reaction with poly(ethylene oxide)), n may be 2 to 10 (between 2 and 5 in some embodiments and between 2 and 4 in more particular embodiments). In other particular embodiments, where $R^1$ is —$CH_3$, n may range up to 20 (and up to 15 in other embodiments). Further, selection of R (or $R^3$) and $R^2$ may also depend on based on the hydrophilicity of the compound due to the extent of polyetherification (i.e., number of n). In selecting each R (or $R^3$), $R^1$, $R^2$, and n, the relative hydrophilicity and lipophilicity contributed by each selection may be considered so that the desired HLB value may be achieved. Further, while this emulsifier may be particularly suitable for use in creating a fluid having a greater than 50% non-oleaginous internal phase, embodiments of the present disclosure may also include invert emulsion fluids formed with such emulsifier at lower internal phase amounts.

The amount of the emulsifier used in the formulation of the wellbore fluid depends on the amount of oleaginous fluid used, as well as the amount of solids dispersed into the oleaginous fluid. For example, in one or more embodiments, a low amount of the emulsifier used in the formulation of the wellbore fluid will call for an increased amount of oleaginous fluid to be used. It is also envisioned that a low concentration of the emulsifier will call for a decreased amount of solids dispersed into the oleaginous continuous phase. However, it was observed that the amount of solids used may be increased without the wellbore fluid setting up as a gel as long as the wellbore fluid is maintained without shear. According to the present embodiments, the concentration of the emulsifier in the wellbore fluid formulation may be at least 4.5 ppb and up to 12 or 15 ppb. For example, in yet another embodiment, the concentration of the emulsifier may be at least 4.8 ppb and up to 12 or 15 ppb. The amount of emulsifier used may vary depending on if a strong emulsifier or a weak emulsifier is used. For example, a weak emulsifier may need to be used in a greater amount to maintain the emulsion during normal drilling operations (e.g., prior to the experience of fluid loss) so that the reactant present therein only react upon the increase in shear initiated after experiencing fluid loss.

The invert emulsion fluids of the present disclosure may include one or more viscosifiers that are conventionally considered to be viscosifiers suitable for water-based fluids. Thus, the one or more viscosifiers may be water-hydratable. When dispersed in an oleaginous fluid, such as prior to pumping the instant invert emulsion downhole, the fluid remains relatively thin (i.e., pumpable). However, upon exposure of the water-hydratable viscosifiers to the non-oleaginous fluid, the viscosifiers may hydrate and/or crosslink, thereby converting the pumping fluid into a gel or substantially solid material. A variety of viscosifiers may be added to the wellbore fluids of the present disclosure that are generally selected from the group of natural or synthetic polymers. For example, viscosifiers such as guar gums, xanthan gum, wellan gum and biopolymers such as alginate, carrageenan, and scleroglucan, starches, cellulose (and modified cellulose, such as cellulose ethers), lignite and lignosulfonate, and synthetic polymers such as polyacrylates and polyacrylamides may be added to the wellbore fluid system of this disclosure. The polymers that have shown particular utility in the present disclosure are selected from the group of biopolymers, such as polysaccharides. In one or more embodiments the viscosifier is xanthan. According to the present embodiments, the amount of the viscosifier dispersed into the oleaginous continuous phase may be at least 2, 3, or 4 ppb. Additionally, lime or other alkaline materials may be added to conventional invert emulsion drilling fluids and muds to maintain a reserve alkalinity. In addition, as discussed later in detail, the lime may also crosslink the polymer.

According to the present embodiments, the wellbore fluids as described herein may also include clays which may be useful as viscosifiers and/or emulsion stabilizers in the wellbore fluid composition disclosed herein. In one or more embodiments, the clays are selected from the group of hydratable clays, such as bentonite clay. The clays that have shown utility in the present disclosure are selected from the group of non-organophilic clays. Such clays have been used in an effort to supplement the gel strengths usually provided by organophilic clays. According to the present embodiments, the amount of the hydratable clay used in the formulation of the wellbore fluids of the present disclosure may range from about 10 ppb to about 20 ppb, where the lower limit can be any of 10 ppb, 12 ppb, or 15 ppb and the upper limit can be any of 18 ppb, 19 ppb or 20 ppb, where any lower limit can be used with any upper limit.

In one or more embodiments, the wellbore fluids of the present disclosure may further include a crosslinker. As noted above, upon disruption of the emulsion, the crosslinker may crosslink the viscosifier dispersed in the oleaginous continuous phase with the formation of a gel. The crosslinkers that may be used in the wellbore fluids of this disclosure may be selected from the group of lime borate, citric acid, zirconium, alcohols, and glycols. For example, in various embodiments, the polymer, such as xanthan, may be crosslinked with lime. However, the combinations polymer/crosslinker may be used based on the chemical compatibility of the two components.

The crosslinker may be present in an amount effective to crosslink the polymer. In one or more embodiments, the crosslinker may be used in an amount of at least 1, 3 or 5 ppb However, the amount of crosslinker may affect the hardness of the resulting gelled fluid. For example, in some embodiments, for a constant weight of polymer, increasing the amount of crosslinker may result in a higher crosslinking density, and therefore a harder gel.

As noted above, the base fluids described herein may be oil-based wellbore fluids, such as an invert emulsion where a non-oleaginous discontinuous phase is emulsed within an oleaginous continuous phase. In one or more embodiments, the oleaginous continuous phase is selected from the group including petroleum oil, a natural oil, mineral oil, a synthetic oil, a silicone oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids. Generally, the amount of the oleaginous phase may be sufficient to form a stable emulsion when utilized as the continuous phase. The amount of oleaginous phase in the invert emulsion fluid may vary depending upon the particular oleaginous phase used, the particular non-oleaginous phase used, and the particular application in which the invert emulsion fluid is to be employed. The amount of non-oleaginous phase in the invert emulsion fluid may vary depending upon the particular non-oleaginous phase used, the emulsifier selected to stabilize the non-oleaginous phase, and the particular application in which the invert emulsion fluid is to be employed. In one or more embodiments, the oil based fluid may contain at least 70 vol. % water or other non-oleaginous discontinuous phase, and at least 20 vol. % of oleaginous continuous phase.

As mentioned above, the wellbore fluid may be an invert emulsion having a continuous oleaginous phase and a non-oleaginous discontinuous phase (or liquid), such as an aqueous phase, among other substances and additives. Non-oleaginous liquids may, in some embodiments, include at least one of fresh water, sea water, brine, mixtures of water and water-soluble organic compounds, and mixtures thereof. In various embodiments, the non-oleaginous phase may be a brine, which may include seawater, aqueous solutions wherein the salt concentration is less than that of sea water, or aqueous solutions wherein the salt concentration is greater than that of sea water. The salt may serve to provide a portion of the fluid's density (to balance against the formation pressures), and may also reduce the effect of the water based fluid on hydratable clays and shales encountered during completion. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution.

It is also envisioned that the wellbore fluids may include a plurality of particulate enhancements, such as fibers, to enhance the solidification effect. While some embodiments may use a synthetic fiber, other embodiments may include either a naturally occurring fibrous material, and/or a synthetic fibrous material, wherein the fibrous material may provide additional compressive strength to the resulting plug or seal. In one or more embodiments, the fibers may be selected from the group of polyesters, acrylic polymers, polyamides, polyolefins, polyaramides, polyurethanes, vinyl polymers, glass fibers, carbon fibers, regenerated cellulose (rayon), natural fibers or blends thereof. Upon formation of the emulsion, the fibers may be dispersed in the oleaginous phase. Upon disruption of the emulsion, the fibers may be dispersed in the resulting gel or substantially solid material that is formed in place of the emulsion, thereby providing greater strength to the resulting gel or solidified material.

The wellbore fluids of the present application may further contain additional chemicals depending upon the end use of the fluid so long as they do not interfere with the functionality of the fluids (particularly the emulsion when using invert emulsion fluids) described herein. For example, weighting agents, fluid loss agents, wetting agents, dispersants, interfacial tension reducers, pH buffers, mutual solvents, thinners, thinning agents and cleaning agents may be added to the fluid compositions of this disclosure for additional functional properties, as well as for stabilizing the system as a whole and for establishing the desired performance properties. The addition of such agents should be well known to one of ordinary skill in the art of formulating wellbore fluids.

Methods used to prepare the wellbore fluids disclosed herein may involve a desired quantity of oleaginous fluid forming a continuous phase being mixed with a proper amount of an emulsifier. Next, the rest of the additives may be dispersed into the oleaginous continuous phase, in such a manner that they are oil-wet. For example, all dry components, such as at least a viscosifier, a crosslinker and a hydratable clay are dispersed into the oleaginous continuous phase. By dispersing the solid additives into the oleaginous continuous phase their reactivity towards a non-aqueous fluid, such as water, is significantly decreased. Next, a non-oleaginous fluid, such as water, is softly mixed to obtain droplets. Thus, at this stage, all the solid additives may be dispersed in the oleaginous continuous phase, while the non-oleaginous fluid forming the discontinuous phase is present in the emulsion under the shape of droplets. However, there is not enough oleaginous fluid in the oleaginous continuous phase for the additives to remain oil-wet upon breaking the emulsion. At this stage, little shear is applied to the wellbore fluid. In one or more embodiments, the fluid may be mixed with mixers that expose the fluid to shear rate of less than 10,000 s$^{-1}$ or at least the formed emulsion is not subjected to such shear. For example, it is envisioned that all the components are mixed in the pump circulation, with the exception of the non-oleaginous fluid, such as water which is added afterwards using a paddle type system. In contrast, the wellbore fluid may be designed such that the two phases (oleaginous containing the solid components and the non-oleaginous) intermix when exposed to shear rate that may range from 10,000 to 50,000 s$^{-1}$ in some embodiments, or from 12,000 to 30,000 s$^{-1}$. In other embodiments, intermixing of the two phases may occur at shear rate of at least 20,000 s$^{-1}$ or at shear forces of least 30,000 s$^{-1}$ in yet other embodiments. Such shear rates may include those experienced during the drilling fluid exiting the drill bit through the nozzles in the bit. Upon exposure to such shear, the non-oleaginous phase may contact the dispersed solid components (including the water-hydratable and/or crosslinkable polymers present in the fluid), thereby resulting in a sharp increase in the fluid rheology.

In such embodiments, the oleaginous continuous phase and the aqueous discontinuous phase may be selected from any of the liquid phases discussed above. Generally, the concentration of the oleaginous continuous phase should be sufficient so that an invert emulsion forms and may be less than about 99% by volume of the invert emulsion. In one embodiment the amount of oleaginous continuous phase is at least 20% by volume of the invert emulsion fluid. In yet another embodiment, the amount of oleaginous continuous phase is at least 25% by volume of the invert emulsion fluid. In such embodiments, the amount of the aqueous fluid is less than the theoretical limit needed for forming an invert emulsion. Thus, in one embodiment, the amount of the non-oleaginous discontinuous phase, such as an aqueous discontinuous phase, is at least 70% by volume. In yet embodiment, the non-oleaginous discontinuous phase may be present in at least 75% by volume of the invert emulsion fluid.

Upon mixing, the wellbore fluids of the present embodiments may be used in wellbore operations, such as drilling operations in vugular formations or treatment operations. Such operations are known to persons skilled in the art and involve pumping a wellbore fluid into a wellbore through an earthen formation and performing at least one wellbore operation while the wellbore fluid is in the wellbore. For example, water or a cheap polymer based WBM may be initially used for drilling through a subterranean formation until the bottom of the section. Afterwards, the wellbore fluids of the present disclosure may be pumped into the wellbore when the shear forces disrupt the emulsion. The wait period of time for the formation of the gel is relatively short, for example not more than an hour. After the formation of the gel, once the gel reaches a rubber or substantially solid (even cement-like) consistency, the next stage is to drill through the resulting gel or solid material Shear forces (or the stress experienced during pumping) are closely related to the pressure drop experienced by a wellbore fluid passing through constrictions in various pumps, pipes, and drill-bits. A higher pressure drop corresponds to a higher stress applied. The highest stress is observed when the fluid passes through the nozzles in a drill bit or a port of the completion string downhole. By stress sufficient to break an emulsion, it is to be understood in the context of the present disclosure that said sufficient stress is produced by the passage of the wellbore fluid through the nozzles of the drill bit or similar restriction to allow the separation of the emulsion in two phases, namely an oleaginous continuous phase containing dispersed oil-wet additives, and the non-oleaginous discontinuous phase.

According to the present embodiments, a wellbore fluid may include at least an emulsifier that stabilizes an emulsion of the non-oleaginous continuous phase within an oleaginous continuous phase, at least a viscosifier and a hydratable clay. As previously discussed, the viscosifier and the hydratable clay are dispersed into the oleaginous continuous phase, being oil-wet. It is also envisioned that a crosslinker, such as lime, may be dispersed in the oleaginous continuous phase. As the crosslinker is oil-wet is not able to dissolve initially.

Upon subjecting the wellbore fluid to specific shear forces, the emulsion breaks, allowing the components to interact and initiate the formation of a gel or a cement. For example, in one or more embodiments, upon disruption of the emulsion, the non-aqueous fluid may, such as water, may hydrate both the viscosifier (such as xanthan) and the hydratable clay. In such embodiments, xanthan may also interact with lime to crosslink. As a result of the chemical reactions that occur between the additives exposed to the non-oleaginous fluid, a gel having the consistency of rubber forms within an hour. In such embodiments the bentonite clay gives initial viscosity after shear, while the product formed upon crosslinking of the xanthan and lime gives mechanical strength over time. Once the gel reaches the rubber consistency, the next stage is to continue drilling through the gel.

Upon crosslinking of the polymer in the absence or the presence of particulate enhancements, the wellbore fluid starts to solidify, having initially the consistency of a pudding which continues to harden and may transform in a rubber. The rubber is stable for long periods of time. Upon entering a lost circulation zone, the wellbore fluids as described herein may form a seal or a plug at an entrance of a fracture, fissure or vug or inside a fracture, fissure or vug, thereby reducing the loss circulation. After placement, the solidified wellbore fluid is stable for several weeks under downhole conditions, and provides enough time to drill through and complete the section.

It is envisioned that when such loss zone (including but not limited to vugs) is encountered, several options are presented. In one embodiment, the fluid may be immediately substituted with a present fluid or it is also envisioned that drilling may proceed with either water or a cheap polymer water-based mud, where the well may be losing ~100% of fluid to formation (i.e., getting 0% returns). It is also envisioned that the drilling may proceed (with the original drilling mud) until bottom of section. At that point, the operator may pump the present fluid and pull out of the hole. The instant fluid may be allowed to sit for a period of time, such as an hour, to allow the hydration and crosslinking to occur. However, in less than hour, the pumpable fluid has transformed into a gel or substantially solid mass within the well. To resume drilling, the drill bit may advanced through the formed gel/solid materials.

Thus, one embodiment of the present disclosure involves a method of reducing loss of wellbore fluid in a wellbore to a formation. In one such illustrative embodiment, the method includes pumping a wellbore fluid into the wellbore, subjecting the wellbore fluid to shear forces generated by pumping the wellbore fluid into the formation through a nozzle in a drill bit, thereby exposing the viscosifier to the non-oleaginous fluid and allowing the wellbore fluid to solidify. As noted above, the wellbore fluid may include an oleaginous fluid forming a continuous phase, a non-oleaginous fluid forming a discontinuous phase, at least one emulsifier stabilizing an emulsion of the non-oleaginous continuous phase within the oleaginous continuous phase and at least a viscosifier dispersed into the oleaginous continuous phase, where the viscosifier may be present in a concentration of at least 4 ppb. Upon pumping the wellbore fluid into a circulation zone, the wellbore fluid may solidify to form a seal or a plug at an entrance of a fracture, fissure or vug or inside a fracture, fissure or vug, thereby reducing a loss circulation.

The performance of the formulations of this disclosure in controlling the loss circulation was determined by conducting a static shear test.

Static Shear Test

The test involves the use of a shearometer tube, such as a 1.5 inch hollow tube, and a set of weights which can be stacked on top of the tube. The typical use for this test is to evaluate the gel or cement formed upon solidification of the wellbore fluid (how far into the set up gel the tube penetrates with weight). The shear tube is placed on the surface of the gel and weights are applied until the tube sinks to a marked depth. In one or more embodiments, the fluid, once disrupted and solidified, may have a shear strength of at least 40,000 lbs/100 ft$^2$. However, prior to this hydration and reaction, the fluid possesses measurable rheological properties on a Fann 35 viscometer. For example, at 600 or 300 rpm, the fluid, prior to exposure to high shear, may have a dial reading of less than 75, and a dial reading of less than 20 or 10 at low shear of 6 and 3 rpm. However, upon exposure to high shear, the fluid rapidly changes as the components dispersed within the oleaginous phase are exposure to the water.

Advantageously, embodiments of the present disclosure provide wellbore fluids and methods for treating fluid loss in a formation by selectively triggering the wellbore fluid to set up due to shear forces generated by pumping the wellbore fluid into a formation through a nozzle in a drill bit. The shear forces cause the emulsion of the wellbore fluid to break, allowing the components to interact and set up as a gel, plugging a fracture. The gel formed is stable for long periods of time under downhole conditions and provides enough time to drill and complete the section. In addition, upon formation of the gel in a subterranean formation loss circulation is reduced.

Although only a few example embodiments have been described in detail above, those skilled in the art will readily appreciate that many modifications are possible in the example embodiments without materially departing from this invention. Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A wellbore fluid comprising:
   an oleaginous fluid forming a continuous phase;
   a non-oleaginous fluid forming a discontinuous phase;
   at least one emulsifier stabilizing an emulsion of the non-oleaginous continuous phase within the oleaginous continuous phase; and
   at least one viscosifier which is a water-hydratable polysaccharide which is dispersed into the oleaginous continuous phase in a concentration of at least 4 ppb;
   wherein upon subjecting the wellbore fluid to shear rate of at least 10,000 s$^{-1}$, the emulsion is disrupted and the non-oleaginous fluid contacts the at least one viscosifier, thereby solidifying the wellbore fluid.

2. The wellbore fluid of claim 1, wherein the oleaginous continuous phase is present in at least 20% by volume of the wellbore fluid.

3. The wellbore fluid of claim 1, wherein the non-oleaginous discontinuous phase is present in at least 70% by volume of the wellbore fluid.

4. The wellbore fluid of claim 1, wherein the wellbore fluid further comprises at least one hydratable clay.

5. The wellbore fluid of claim 4, wherein the hydratable clay is a non-organophilic clay present in a concentration that ranges from about 10 ppb to about 20 ppb.

6. The wellbore fluid of claim 4, wherein the hydratable clay is dispersed in the oleaginous continuous phase.

7. The wellbore fluid of claim 1, wherein the viscosifier is xanthan.

8. The wellbore fluid of claim 1, wherein the wellbore fluid further comprises at least one crosslinker to crosslink the viscosifier dispersed in the oleaginous continuous phase.

9. The wellbore fluid of claim 1, wherein the wellbore fluid further comprises particulate enhancements selected from the group of fibers.

10. The wellbore fluid of claim 1, wherein the emulsifier is selected from the group of amidoamines.

11. A method of reducing loss of a wellbore fluid in a wellbore to a formation, the method comprising:
pumping a wellbore fluid into the wellbore, the wellbore fluid comprising:
an oleaginous fluid forming a continuous phase;
a non-oleaginous fluid forming a discontinuous phase;
at least one emulsifier stabilizing an emulsion of the non-oleaginous continuous phase within the oleaginous continuous phase; and
at least one viscosifier which is a water-hydratable polysaccharide which is dispersed into the oleaginous continuous phase in a concentration of at least 4 ppb;
subjecting the wellbore fluid to a shear force of at least 10,000 s$^{-1}$ generated by pumping the wellbore fluid into the formation through a nozzle in a drill bit, thereby exposing the viscosifier to the non-oleaginous fluid; and
allowing the wellbore fluid to solidify.

12. The method of claim 11, further comprising pumping the wellbore fluid into a circulation zone, wherein the wellbore fluid solidifies to form a seal or a plug at an entrance of a fracture, fissure or vug or inside a fracture, fissure or vug, thereby reducing a loss circulation.

13. The method of claim 11, wherein the oleaginous continuous phase is present in at least 20% by volume of the wellbore fluid.

14. The method of claim 11, wherein the non-oleaginous discontinuous phase is present in at least 70% by volume of the wellbore fluid.

15. The method of claim 11, wherein the wellbore fluid further comprises at least one hydratable clay.

16. The method of claim 15, wherein the hydratable clay is a non-organophilic clay present in a concentration that ranges from about 10 ppb to about 20 ppb.

17. The method of claim 16, wherein the hydratable clay is dispersed in the oleaginous continuous phase.

18. The method of claim 11, wherein the viscosifier is xanthan.

* * * * *